United States Patent
Rast, Jr.

[15] 3,683,791
[45] Aug. 15, 1972

[54] BARBECUE GRILL
[72] Inventor: Henry J. Rast, Jr., P. O. Box 444, John's Island, S.C. 29455
[22] Filed: Feb. 17, 1971
[21] Appl. No.: 116,003

Related U.S. Application Data
[63] Continuation-in-part of Ser. No. 857,487, Sept. 12, 1969, abandoned.

[52] U.S. Cl. .................99/340, 99/389, 99/446, 99/447, 126/25
[51] Int. Cl. ...............................A47j 37/07
[58] Field of Search........99/340, 259, 339, 341–343, 99/345, 389–390, 393, 421, 443, 446–447, 448–449; 126/9, 25

[56] References Cited

UNITED STATES PATENTS

| | | |
|---|---|---|
| 1,836,894 | 12/1931 | Bedigian............126/25 R UX |
| 2,335,217 | 11/1943 | Tate....................99/421 H X |
| 2,441,190 | 5/1948 | Fuller......................126/25 R |
| 2,608,191 | 8/1952 | Schmidt et al. ..........126/25 R |
| 2,923,229 | 2/1960 | Halford ....................99/339 |
| 3,079,208 | 2/1963 | Compton.................99/339 X |
| 3,091,170 | 5/1963 | Wilson.................126/25 A X |
| 3,276,351 | 10/1966 | Sundholm....................99/339 |
| 3,306,280 | 2/1967 | Vannoy....................126/25 R |
| 3,324,788 | 6/1967 | La France................99/446 X |

*Primary Examiner*—Walter A. Scheel
*Assistant Examiner*—Arthur O. Henderson
*Attorney*—Birch, Swindler, McKie & Beckett

[57] ABSTRACT

Apparatus for direct or indirect grilling and/or smoking of meats, fowl, fish using fuel such as charcoal comprising a ventilated housing which can be divided by a removable wall into two separate cooking zones, each of which contains a grill assembly including spaced vertical fireboxes and horizontal grills.

19 Claims, 9 Drawing Figures

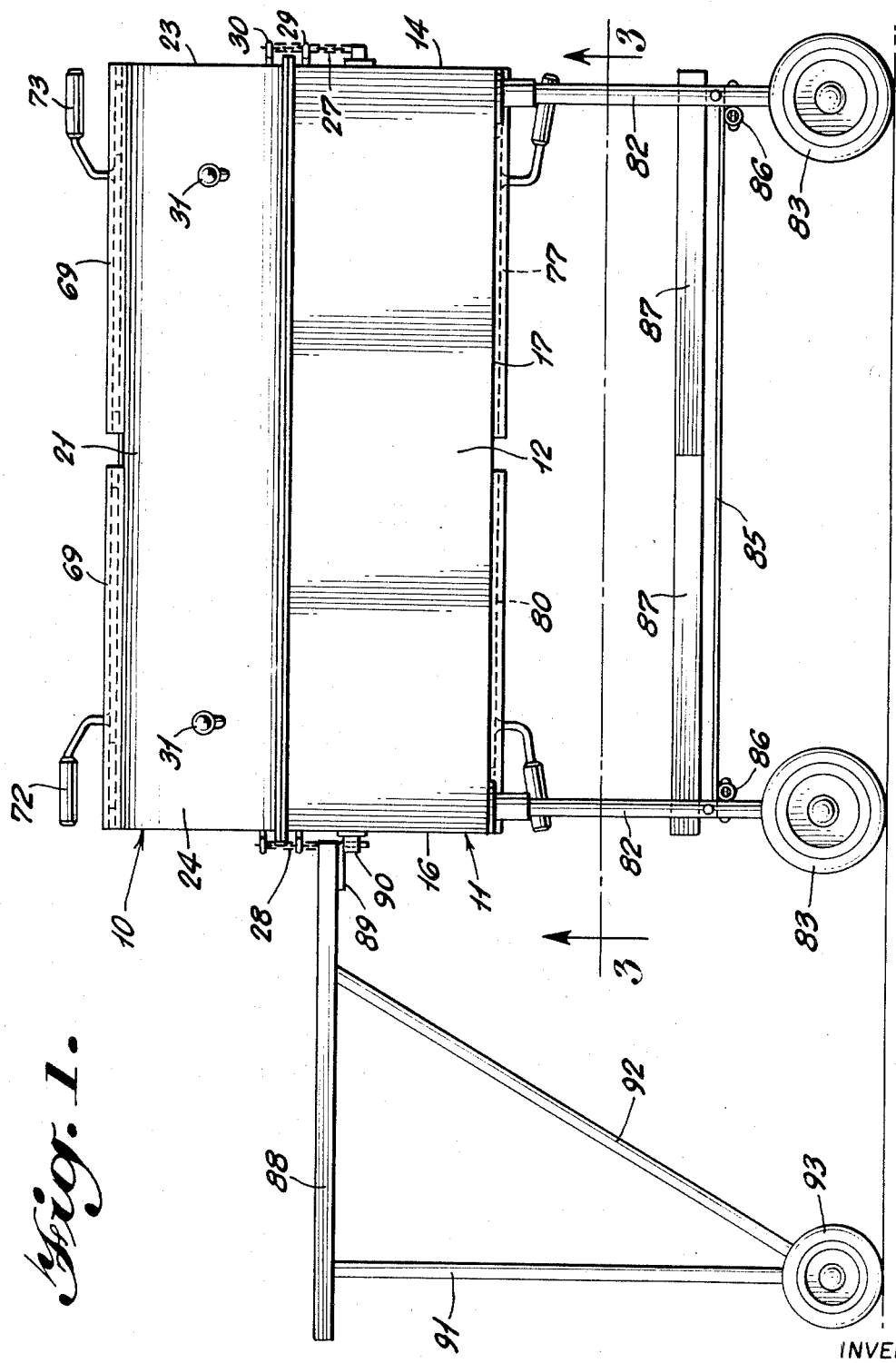

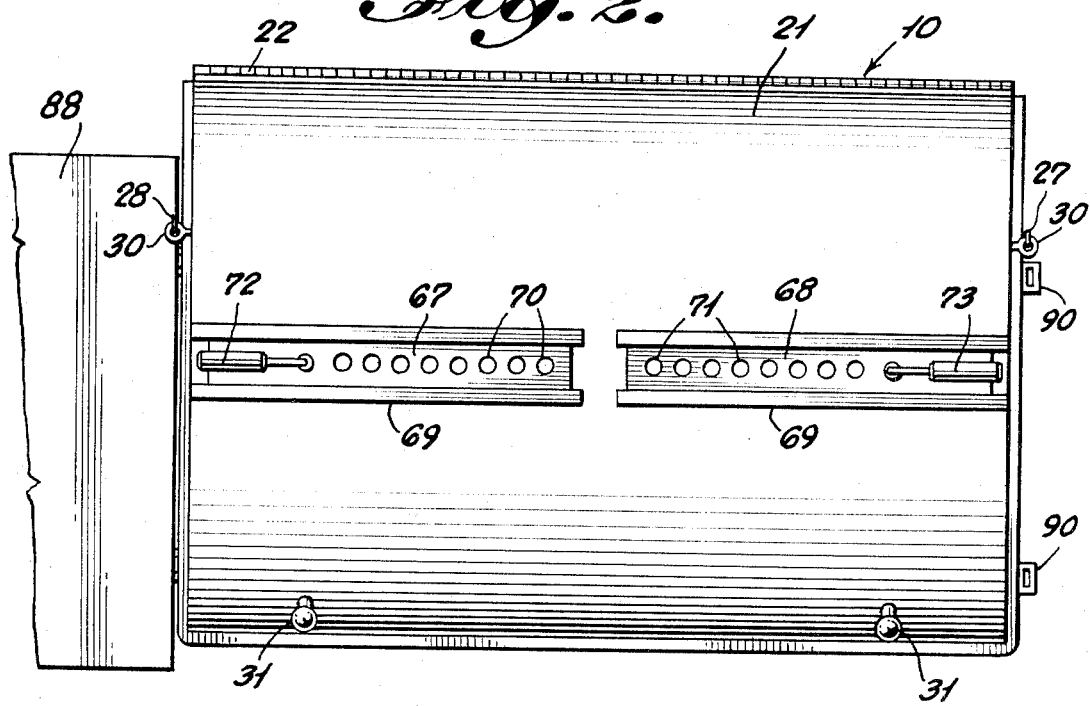
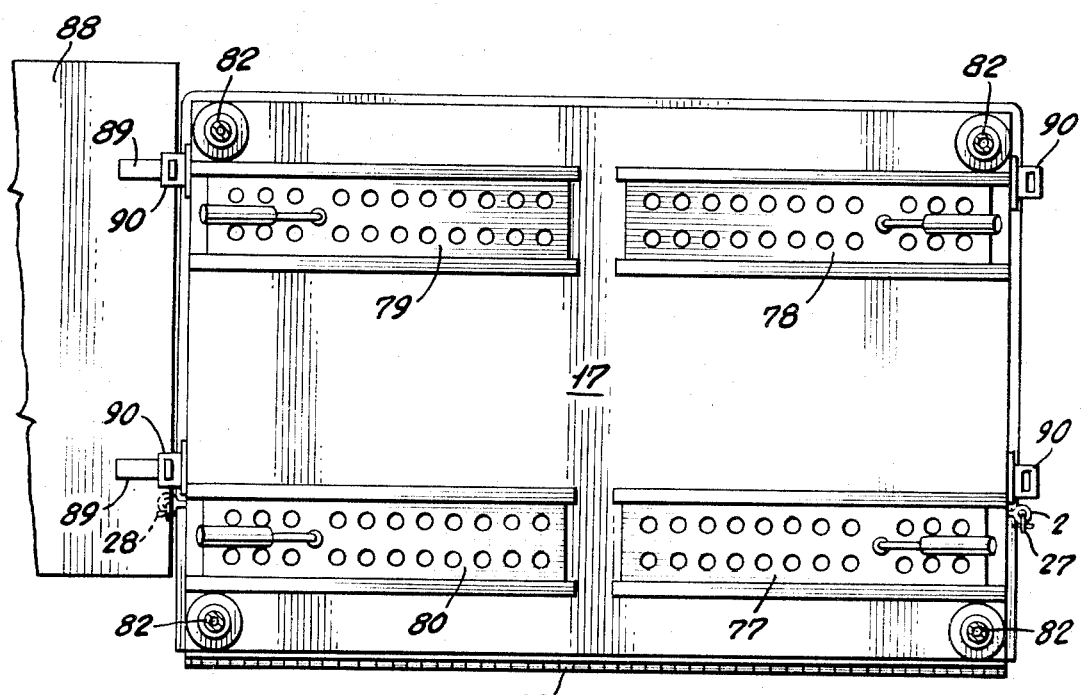

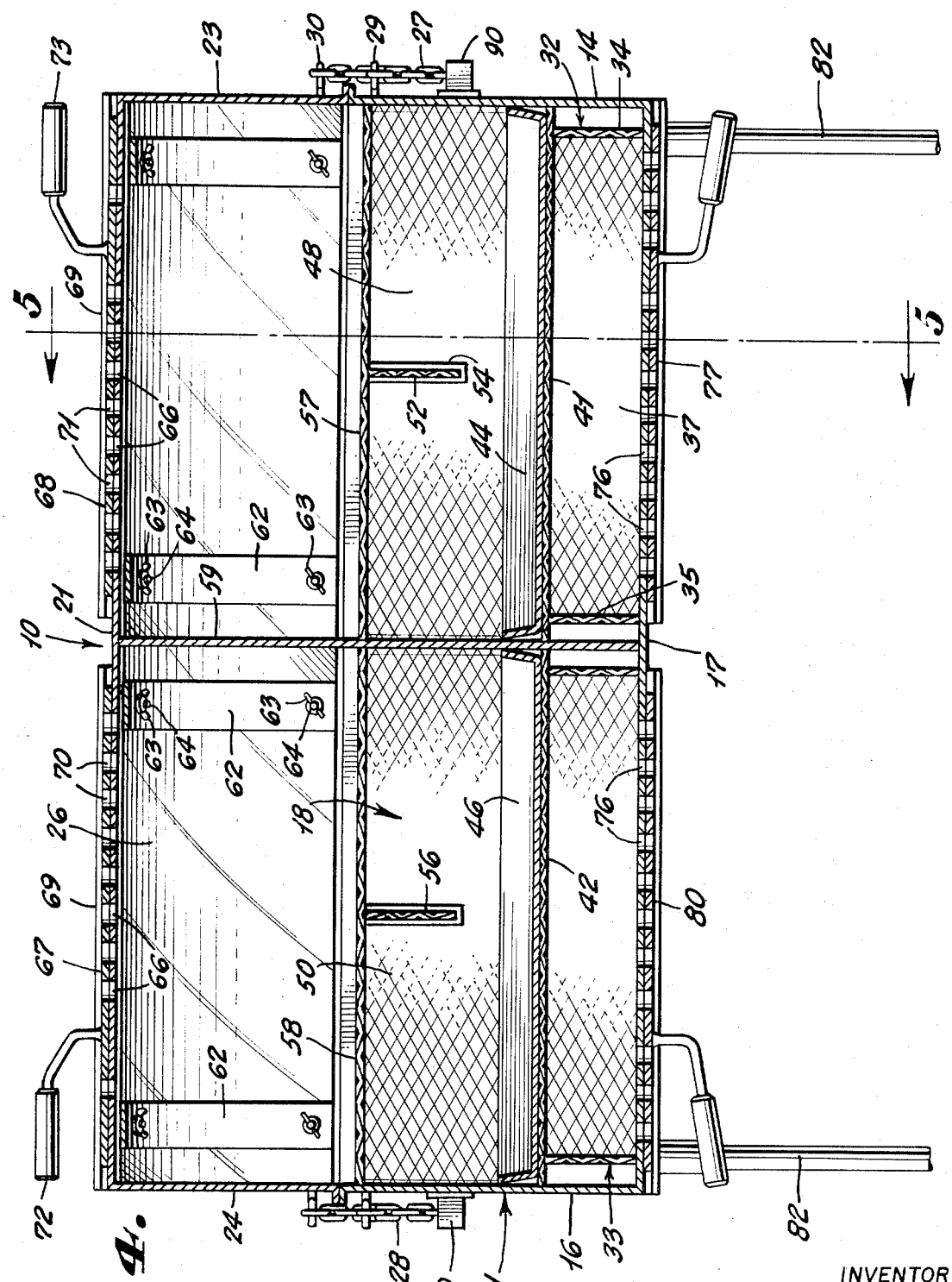

INVENTOR
HENRY J. RAST, Jr.

BY
Birch, Swindler, McKie & Beckett
ATTORNEYS

INVENTOR
HENRY J. RAST, JR.,

INVENTOR
HENRY J. RAST, JR.

3,683,791

1

BARBECUE GRILL

RELATED APPLICATION

This application is a continuation-in-part of application Ser. No. 857,487 filed Sept. 12, 1969, now abandoned.

BACKGROUND OF THE INVENTION

Various designs of barbecue grills and ovens have been proposed in the past. However, most of such barbecue units have been unsatisfactory for one or more of the following reasons: (1) difficulty in cleaning, (2) only one type of cooking can be performed thereon, (3) difficult to assemble and disassemble, (4) uneven cooking requiring careful rearrangement of the food in order to obtain uniform cooking, and/or (5) the drippings from the food fell directly on to the charcoal causing flame-ups and undesirable quantities of smoke. While many of the individual drawbacks mentioned above have been solved by various previously known cooking apparatus, it is not believed that all have been solved in one unit.

Accordingly, it is an object of this invention to provide a versatile barbeque unit which can be used for preparing food in several selective modes of operation.

It is a further object of the instant invention to provide a highly effective barbecue unit which is easy to assemble, disassemble and clean.

It is still another object of the invention to provide a barbecue grill capable of cooking the good on both sides simultaneously and in the presence of a controlled amount of smoke.

SUMMARY

Generally speaking, the invention comprises a barbecue grill for preparing food with solid fuel, such as charcoal. A ventilated housing having end walls, sidewalls and a bottom wall defines a chamber in which is mounted a grill assembly which includes a number of parts. A pair of vertically disposed fireboxes for receiving the fuel are supported in the housing parallel and contiguous to the sidewalls. In a first embodiment, a support rail is mounted in between the fireboxes for maintaining the spaced apart relationship of the same. An upper horizontal grill to receive the food to be cooked is positioned on the support rail and extends from one firebox to the other, with its outer edges supported by the inner edges of the tops of the fireboxes. A cover may extend over the top of the housing provided with a reflective surface in order to direct the radiant heat from the fireboxes onto the top of the grill to cook the upper side of the food. In a second embodiment of the invention, the upper horizontal grill lockingly engages the tops of the fireboxes. Spacing between the fireboxes is maintained by the upper horizontal grill and by a drip pan positioned below the upper horizontal grill between the fireboxes. In both embodiments, the housing can be divided by a removable wall or divider into two separate cooking zones. Each of the zones contains a grill assembly and can be utilized for cooking as described in the preceding paragraph either separately or as a single unit. Further more, the two zones may be used simultaneously for different types of cooking. For example, the fuel may be in the fireboxes for indirect cooking in one zone and spread in flat fashion directly below the upper horizontal grill for direct cooking in the other zone.

DRAWINGS

Other objects, aspects and advantages of the invention will become apparent by the following detailed description and drawings of a specific embodiment thereof wherein:

FIG. 1 is a front elevational view of the invention showing a barbecue grill and oven with the cover closed;

FIG. 2 is a top plan view of the apparatus shown in FIG. 1 with portions removed, showing the vents in the upper portion of the cover;

FIG. 3 is a bottom plan view partially in section taken along the line 3—3 of FIG. 1 showing the vents in the bottom of the unit;

FIG. 4 is a vertical cross sectional view of a first embodiment of the invention taken longitudinally through the apparatus shown in FIG. 1, with portions removed, showing the separate cooking zones of the unit;

DESCRIPTION OF THE INVENTION

Figure 5:
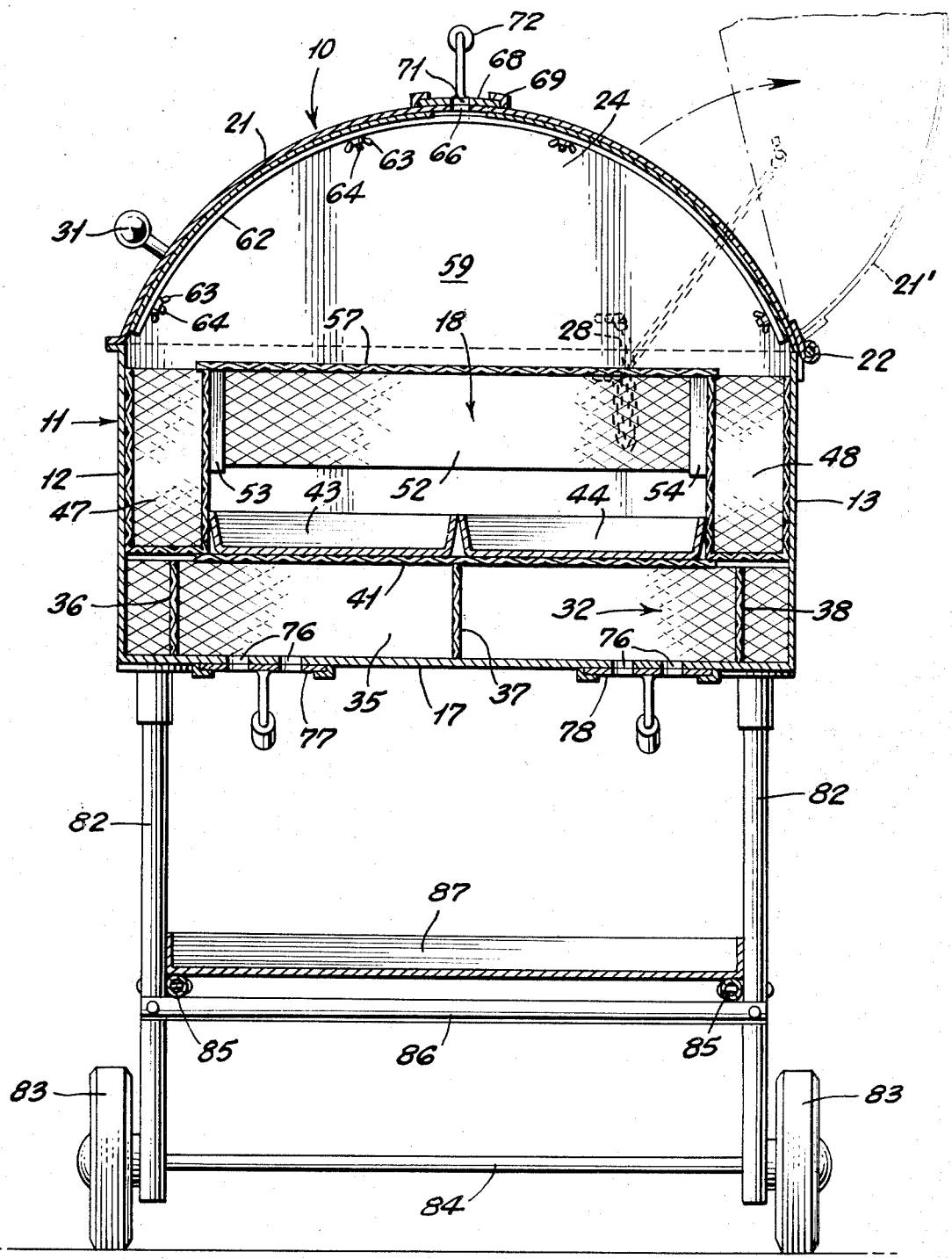
FIG. 5 is a transverse cross sectional view taken along the line 5—5 of FIG. 4 and showing the cover in phantom lines in its open position.

Referring to FIGS. 1, 4 and 5 there is shown a first embodiment of a barbecue unit, designated generally 10. The barbecue unit 10 includes a housing 11 formed with sidewalls 12 and 13, end walls 14 and 16 and a bottom wall or base 17. Each of the walls of 12, 13, 14, 16 and 17 is substantially rectangular in shape forming a chamber, designated 18, therebetween. An arcuately shaped cover 21 is hingedly connected at 22 to the sidewall 13, as shown in FIG. 5. The cover 21, as shown in phantom lines at 21, is in the open position. The cover 21 includes end walls 23 and 24 defining a chamber 26. The angle to which the cover 21 can be opened is controlled by a pair of chains 27 and 28. The chain 27 is secured at one end to a rod 29 extending from the end wall 14, and secured at the other end to a hook 30 which extends laterally from the end wall 23 of the cover 21. The chain 28 is connected in a similar manner to the end walls 16 and 24. Also, handles 31 are provided on the surface of the cover 21 opposite from the hinges 22 to facilitate opening and closing of the cover.

Figure 6:
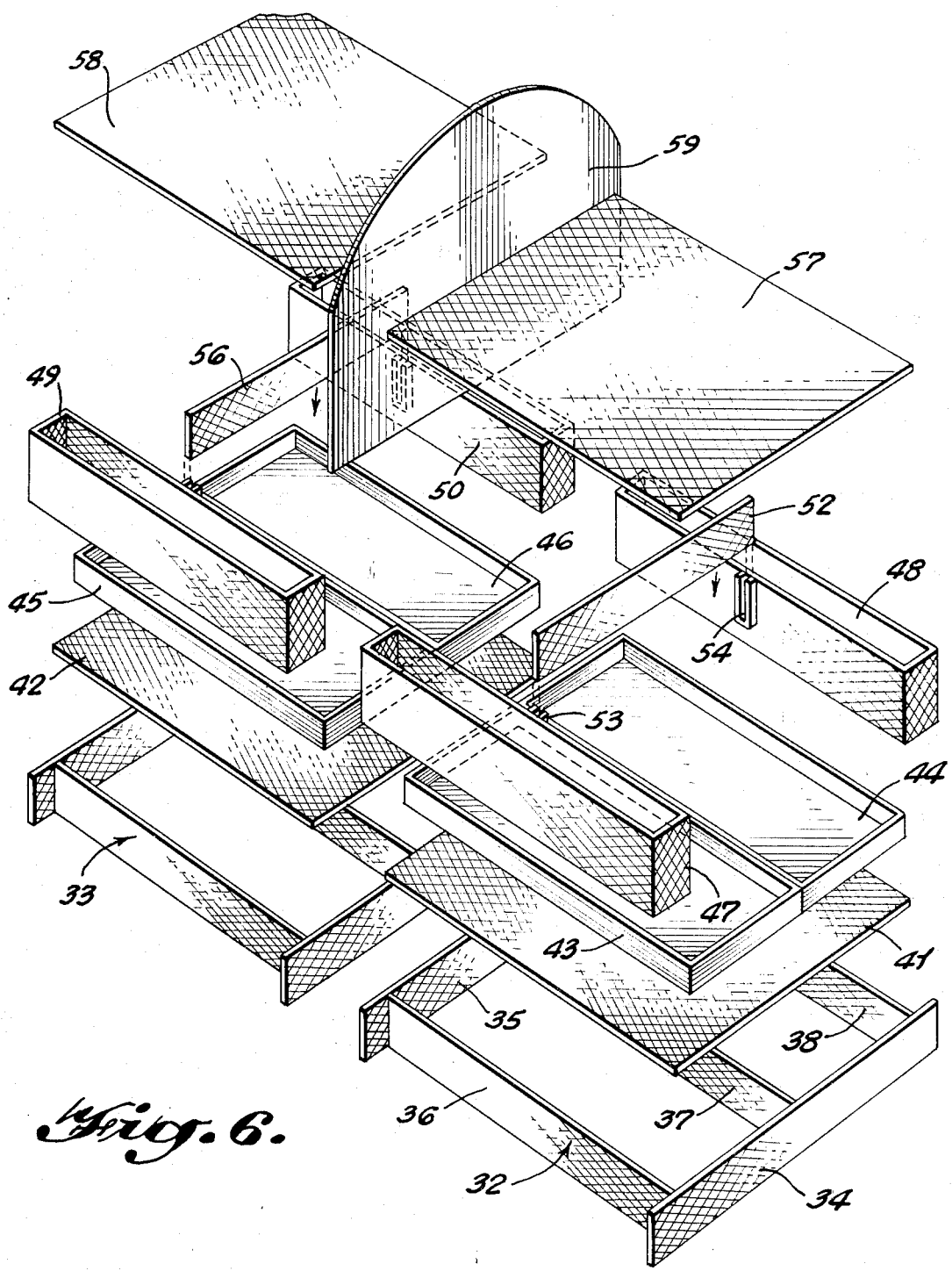
FIG. 6 is an exploded, perspective view of the various component parts of the grill assemblies of a first embodiment of the invention which fit inside the housing shown in FIG. 1.

Referring to FIGS. 4-6, there is shown in detail the grill assemblies of a first embodiment of the invention which are mounted within the chamber 18 in the housing 11. Supported on the base 17 are a pair of bottom support members 32 and 33. The support member 32 includes a pair of end walls 34 and 35 and three lengthwise vertical walls 36, 37 and 28. The support member 32 is adapted to rest on the base 17 at one end of the chamber 18 while the other support member 33 is similarly supported immediately adjacent thereto. The support member 33 is constructed in an identical manner to member 32.

The upper surface of the walls 34–38 are adapted to receive and support a lower horizontal grill 41, while the support element 33 receives a similar lower horizontal grill 42. The grills 41 and 42 serve several functions depending upon the particular mode of cooking. For example, it is possible to place the fuel, such as charcoal, on the grills 41 and/or 42 for direct cooking. In this case the charcoal would be immediately below the food being prepared, and it would be necessary to turn the food at least once in order to obtain cooking on both sides. In another mode of operation, the grills 41 and 42 can serve as supports for drip pans designated 43, 44, 45 and 46. In this mode of operation, as will be described hereinafter, the grills do not act to hold the fuel on their surfaces but instead form the foundation for two pairs of opposed, spaced fireboxes designated 47, 48, 49 and 50. Each of the fireboxes 47–50 includes a base, vertical sidewalls, and end walls and are open at the top. The fireboxes 47–50 can be filled with charcoal to provide heat for indirect cooking. Mounted between the fireboxes 47 and 48 is a first support rail 52 which is slidably received in slotted U-shaped brackets 53 and 54 mounted on the inner opposed walls of the fireboxes 47 and 48, respectively. A similar support rail 56 is slidably mounted between the fireboxes 49 and 50 in a like manner. The support rails 52 and 56, in addition to maintaining the spacing of the fireboxes 47–50, also serve as laterally extending supports for upper horizontal grills 57 and 58, respectively. As shown in FIG. 5, the upper grill 57 plans the entire width between the fireboxes and is supported on the inner top edges of the fireboxes 47 and 48 as well.

The grills 57 and 58 are identical and interchangeable with one another and are also identical and interchangeable with the grills 41 and 42, thereby simplifying the construction thereof. The grills 57 and 58 are adapted to receive the food to be cooked. When it is desired to use only one of the grills 57 or 58 a removable wall or divider 59 may be inserted therebetween to form two separate and substantially identical cooking compartments or zones within the housing. Moreover, with the divider 59 in place the two grill assemblies may be used separately for different purposes. For example, direct heating can be effected in one zone and indirect heating in the other. Of course, if it is desired to cook a large piece of meat such as a side of beef, a pig or the like, the divider 59 may be removed in which case the housing 11 forms a single cooking compartment and the two grill assemblies function as a single unit.

As shown in FIG. 5, the charcoal which is placed in the fireboxes 47–50 is positioned below the grills 57 and 58 so as to supply heat to the bottom side of food placed thereon. Radiant heat also emanates upwardly against the inside surface of the cover 21. This radiant heat is redirected or reflected downwardly onto the upper surface of the grills 57 and 58 and any food positioned thereon by placing a reflective material, such as aluminum foil, on the inside of the cover 21. The foil can be held against the upper surface of the cover 21 by four curved straps 62 (FIGS. 4 and 5). The straps can be removably secured to the cover 21 by any conventional means, such as wing nuts 63 which can be fastened on bolts 64 extending inwardly from the cover 21 through apertures or slots in the straps 62.

In addition to placing foil on the inside of the cover 21, foil can also be placed over the upper surface of the base 17 and over the drip pans 43–46 in order to facilitate cleaning of the respective members.

The temperature inside the barbecue grill 10 as well as the quantity of smoke therein can be controlled by a plurality of air vents to be described hereinafter. As shown in FIGS. 2 and 4, the cover 21 is provided with a plurality of apertures 66 which extend along the apex of the cover 21. A pair of slidable plates 67 and 68 are mounted in brackets 69 above the apertures 66 and are provided with apertures 70 and 71, respectively, which are substantially the same size as the apertures 66. Longitudinal movement by the respective handles 72 and 73 of the plates 67 and 68 from the open position shown in FIG. 4 results in a partial or total closing of the apertures 66 depending upon the exact position of the plates. Thus, the flow of air and other gases through the apertures 66 can be controlled from a maximum to essentially no flow.

Likewise, the base 17 as shown in FIGS. 3 and 4, is provided with apertures 76 arranged in four parallel lines. Mounted beneath the apertures 76 are four separate, similarly apertures plates 77, 78, 79 and 80 which operate in the same manner as the vents described hereinabove in the cover 21. As the apertures 66 and 76 are further opened the amount of oxygen available to the fuel is increased and thereby the rate of combustion and the amount of heat generated are likewise increased. Similarly, as the draft or venting is decreased, the rate of combustion within the unit 10 is decreased and at the same time the accumulation of smoke is increased. Thus, if it is desired to cook the food more slowly and in the presence of a substantial amount of smoke, the apertures 66 and 76 should be regulated accordingly. Of course, if the vents are totally closed, and assuming that the remainder of the grill is substantially airtight, there may not be enough oxygen within the unit 10 to support combustion of the fuel.

As described previously, the utilization of the divider 59 permits the separate cooking chambers created thereby to be utilized either separately or simultaneously and under different temperature and smoke conditions. Thus, if a fast grilling of one type of food is desired simultaneously with a slower smoking and cooking of another food, this can be accomplished by regulating the venting conditions of the separate compartments. Furthermore, it is possible to grill food directly on either of the upper grills 57 or 58 without the utilization of the fireboxes 47–50. Thus, the versatility of the subject invention which permits numerous arrangements of cooking either simultaneously or at different times is apparent.

As shown in FIGS. 1 and 5, the housing 11 is supported on four legs 82 which extend downwardly from the base 17. The legs 82 are each provided with wheels 83 mounted on axles 84 so that the unit can be moved from one position to another. Mounted between the legs 82 lengthwise and widthwise are struts 85 and 86 to add rigidity to the structure. The struts 85 also act as supports for a pair of ash pans 87 which catch the ashes which may fall through the apertures 76 in the base 17.

A table 88 is supported at one end of the housing 11 by any convenient means such as an angle iron 89 (FIG. 1). Depending from the table 88 are legs 91 and 92 which are secured to an axle (now shown) to which are connected another pair of wheels 93. The table 88 is convenient for supporting food either in preparation for cooking or after removal from the barbecue unit 10.

The grill assemblies are retained securely in place without any fastenings. The bottom supports 32 and 33 fit snugly within the housing in contiguous relation to each other and to the end walls of the housing. When the partition 59 is in place, it functions as one end wall for each heating zone. The fireboxes are positioned parallel and contiguous to the side walls of the housing. Their respective ends are contiguous to the end walls of the housing and the divider 59. Thus, when the spacers 52 and 56 are in place the fireboxes are held snugly in place by the housing walls. The spacing of the spacers 52 and 53 above the lower horizontal grills provide room for the drip pans or for charcoal. The fireboxes of the one grill assembly are aligned in close end-to-end relationship to the fireboxes of the other grill assembly. The two lower horizontal grills are co-planar and the two upper horizontal grills are co-planar.

After the barbecue unit 10 has been used and is ready for cleaning, the cover 21 is opened and (as shown in FIG. 6) the various elements may be removed seriatim merely by lifting them upwardly since no fastenings are required. The various parts of the grill assembly are held in place solely by upward and lateral restraint imposed by each other and by the housing. The upper grills 57 and 58 should first be removed followed by the firebox spacers 52 and 56. The divider 59 may also be removed at this time. The fireboxes 47-50 may then be lifted out of the housing 12, followed by the drip pans 43-46. Thereafter the lower grills 41 and 42 may be removed as well as the bottom supports 32 and 33. After removal of the ashes from the bottom of the housing and replacement of foil thereover, the various elements can then sequentially be placed back in the housing after suitable cleaning merely by lowering them in place in reverse order. It should be noted that if the base 17 is covered with foil, holes should be punctured in the foil corresponding with the apertures 76 (FIG. 4) so as to permit free venting in the housing 11.

If desired, the barbecue unit 10 can be made half as long by eliminating one of the grill assemblies. The housing would be reduced in length so that its two end walls would be contiguous to the remaining grill assembly. Such a single unit apparatus could be of any desired length.

The major portion of the interior elements of the housing 11 are preferably constructed of diamond mesh expanded metal which is relatively inexpensive, lightweight and easy to clean. The elements made of expanded metal as shown in the drawings include the bottom supports 32 and 33, the lower grills 41 and 42, the fireboxes 47-50, the spacers 52 and 56, and the upper grills 57 and 58. As will be apparent to those skilled in the art, other material of an open work nature such as heavy wire mesh can be used to construct the various elements.

Figure 7:
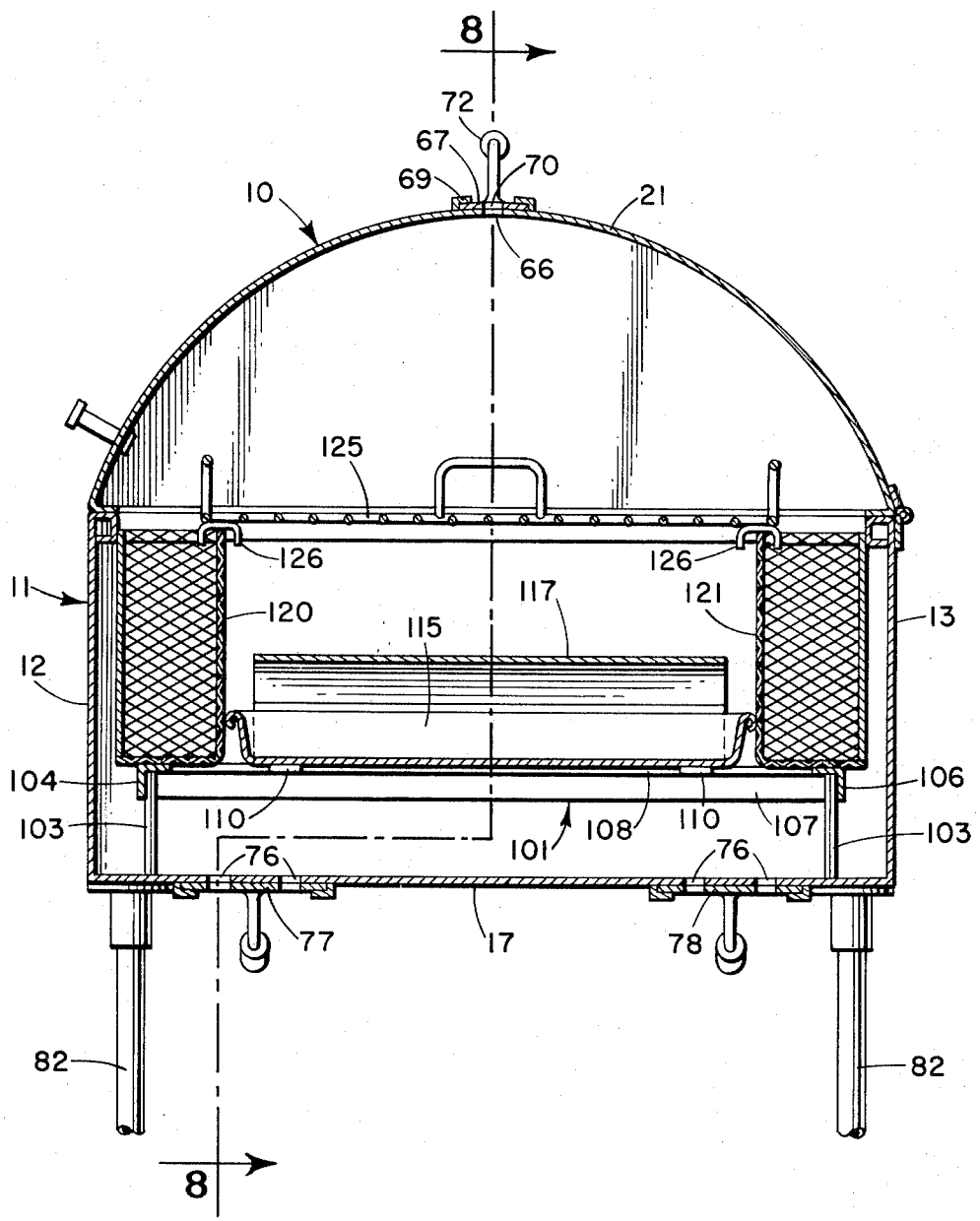
FIG. 7 is a transverse cross sectional view of a second embodiment of the invention.
Figure 8:
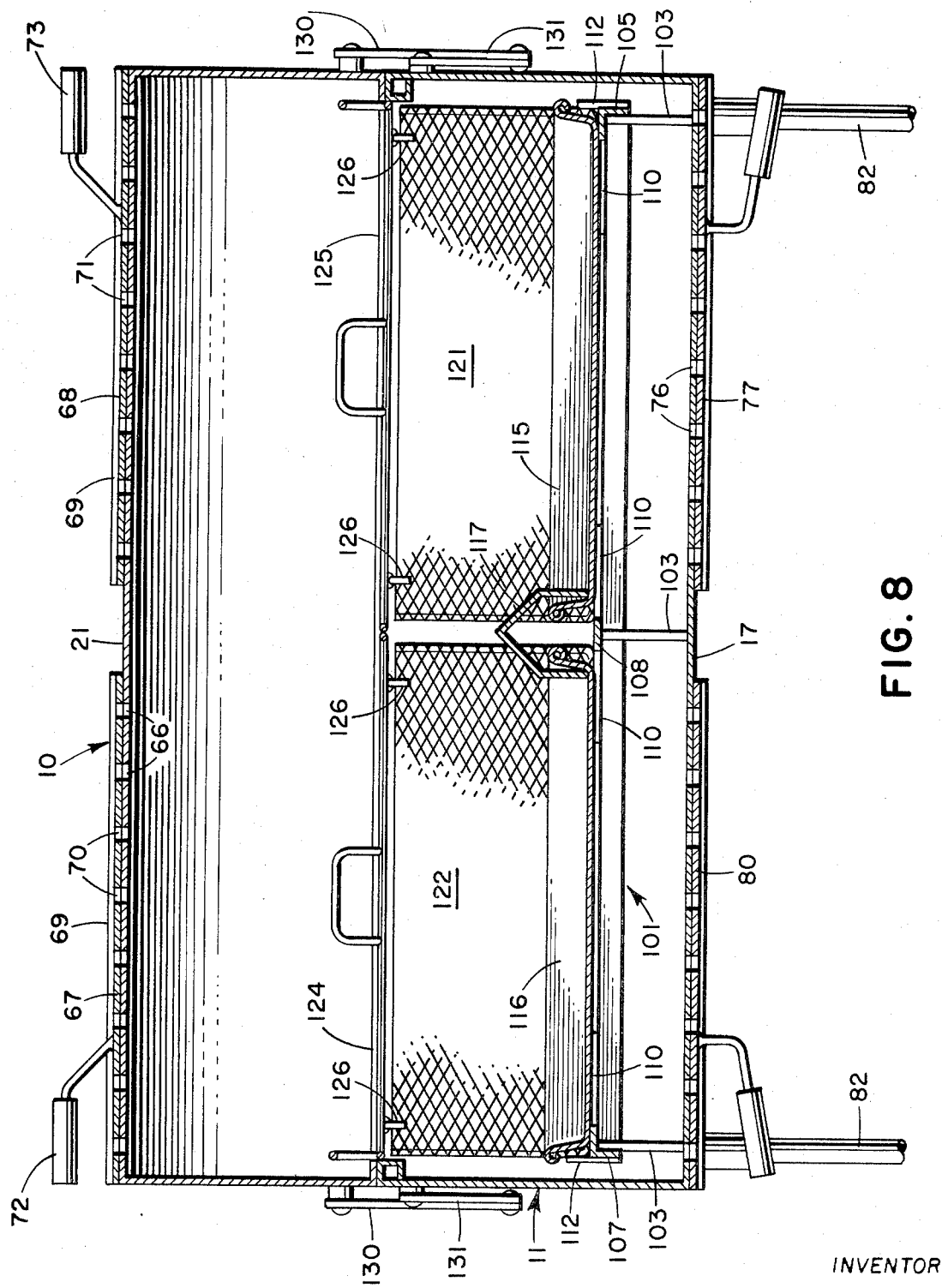
FIG. 8 is a vertical cross sectional view taken along the lines 8—8 of FIG. 7.
Figure 9:
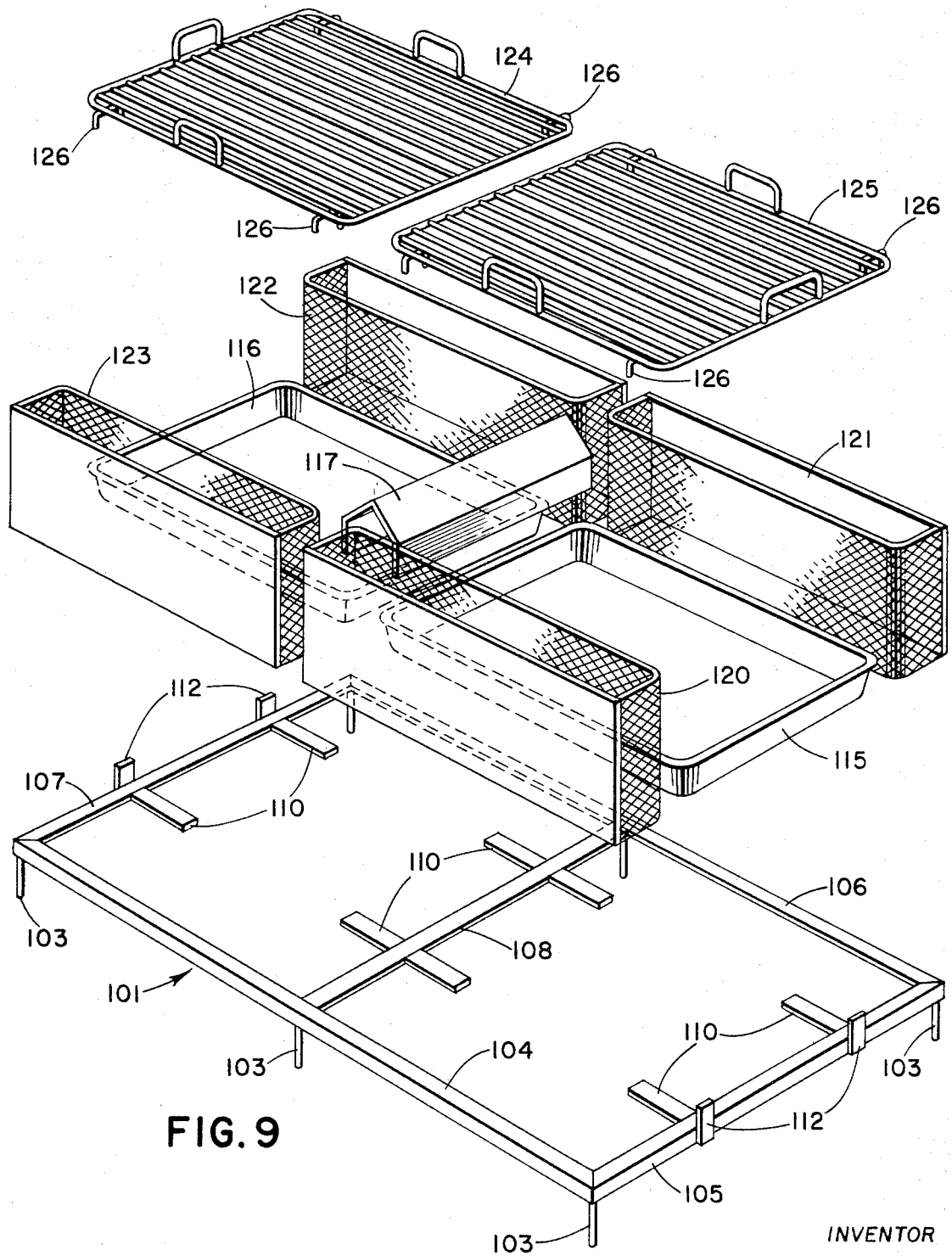
FIG. 9 is an exploded, perspective view of the various component parts of the grill assemblies of a second embodiment of the invention which fit inside the housing shown in FIG. 1.

A second embodiment of the invention utilizing grill assemblies different from those of the first embodiment is shown in FIGS. 7-9.

The grill assemblies of the second embodiment of the invention are adapted to be mounted within chamber 18 in housing 11. Supported on base 17 is a bottom support frame indicated generally at 101 having a plurality of support legs 103 attached to side members 104-107 and a center member 108. Attached to side members 105 and 107, and to center member 108, are a plurality of inwardly extending support arms 110 upon which rest the drip pans or the lower horizontal grills hereinafter described. A plurality of upstanding fingers 112 can also be provided on side members 105 and 107 in order to confine the drip pans or lower horizontal grills. Bottom support frame 101 is adapted to rest on the base 17 with legs 103 in contact therewith, and upon frame 101 rest two drip pans 115 and 116 or a pair of lower horizontal grills. These lower grills are not illustrated in conjunction with the second embodiment of the invention, but can be identical to those described above with the first embodiment of the invention. The lower horizontal grills are substituted for the drip pans when it is desired to use direct cooking by placing the charcoal directly beneath the food. Although two drip pans 115 and 116 are shown, it should be understood that any appropriate number may equally well be utilized with the invention. When a plurality of drip pans are utilized, it is advantageous to provide grease deflectors 117 to span the gap between the edges of adjacent drip pans as shown in FIG. 8, in order to insure that all grease is collected in the drip pans rather than allowed to drain down to the bottom 17 of housing 11. Although not illustrated in FIGS. 7-9, a divider may be placed between drip pans 115 and 116 in order to provide two separate identical cooking compartments, as discussed in detail above in regard to the first embodiment of the invention and as shown in FIGS. 4 and 6. Obviously, when such a divider is used, deflectors 117 are removed.

Also supported by bottom support frame 101 are a plurality of side fireboxes 120-123 which can be of expanded metal construction and into which charcoal is placed when the indirect mode of heating is desired. Each firebox 120 comprises a base, inner and outer vertical side walls, and end walls, and is open at the top. Fireboxes 120-123 are contiguous with the side walls 12 and 13 of chamber 11, and rest upon side members 104-108. Drip pans 115 and 116 are mounted between opposed pairs of fireboxes and function to maintain the lower spacing between the fireboxes. Mounted on the tops of fireboxes 120-123 are two upper horizontal grills 124 and 125 having U-shaped brackets 126 that lockingly engage the inner side walls of the fireboxes. Fireboxes 120-123 thus provide support for grills 124 and 125, and the grills lend stability and maintain the proper upper spacing between opposed pairs of fireboxes. FIG. 7 clearly illustrates the interrelationship between fireboxes, drip pans, and upper horizontal grills that maintains the spacing between each pair of opposed fireboxes.

The grill assembly of this second embodiment of the invention, like that of the first embodiment, is installed in housing 11 without the use of fasteners or connectors. The interaction of the various parts insures the proper relationship of elements and stability of construction. Thus, all elements are easily removable and easily cleaned. Bottom support frame 101 fits snugly within the bottom of housing 11. Each drip pan is of such width as to maintain proper spacing between the bottom of opposed pairs of fireboxes. Proper spacing at the top of the fireboxes is provided by the upper horizontal grills. Adjacent grill assemblies are closely disposed in end to end relationship with their upper horizontal grills and drip pans respectively in co-planar relationship.

In FIG. 8 there is shown an alternative arrangement for limiting the opening of hood 10 consisting of link 130 and 131 pivotally fastened respectively to hood 10 and housing 11, and to one another.

The operation of this second embodiment of the invention is identical to that set forth above in regard to the first embodiment. By use of the side fireboxes 120–123 indirect cooking of foods placed upon upper horizontal grills 124 and 125 is accomplished. Should direct cooking be desired, the lower horizontal grills can be substituted for drip pans 115 and 116, and charcoal placed thereupon directly beneath the foods on the upper horizontal grills. The flow of heat within housing 11, and the control of air flowing thereinto, is identical to that described above with regard to the first embodiment of the invention.

I claim:

1. A barbecue grill for cooking food with charcoal, which comprises a ventilated housing having end walls, side walls and a bottom defining a chamber therein, and a grill assembly in said housing, said grill assembly comprising:
    two spaced vertically disposed fireboxes in said housing parallel and contiguous to said side walls for receiving charcoal;
    spacer means mounted between and maintaining the spacing of said fireboxes;
    a bottom support member positioned below said fireboxes and having an upper supporting surface to maintain said fireboxes spaced above the bottom of said housing; and
    an upper horizontal grill mounted above said spacer means and extending from one firebox to the other for receiving the food to be cooked, said upper horizontal grill having its outer edges supported by the inner edges of said fireboxes.

2. A barbecue grill as recited in claim 1 wherein said fireboxes, spacer means, bottom support member and upper horizontal grill are maintained in assembled relationship solely by upward and lateral restraint imposed by each other and said housing to permit them to be assembled and disassembled merely by being lowered in and lifted out of said housing.

3. A barbecue grill as recited in claim 1 comprising a pair of said grill assemblies positioned in close end-to-end relationship, and a removable wall mounted between said assemblies to form one end wall for each assembly, the fireboxes of the different assemblies being aligned in end-to-end relationship and the upper horizontal grills of the different assemblies being coplanar, whereby said grill assemblies may be used separately with said removable wall in place or as a single unit with said removable wall removed.

4. A barbecue grill as recited in claim 1 wherein said housing includes a cover having a curved inner surface with reflective material thereon.

5. A barbecue grill as recited in claim 1 wherein said spacer means includes a support rail mounted between and maintaining the spacing of said fireboxes.

6. A barbecue grill as recited in claim 5 further comprising a lower horizontal grill positioned on the top of said bottom support member and extending between the two spaced fireboxes.

7. A barbecue grill as recited in claim 6 further comprising brackets on said fireboxes to support said support rail spaced above said lower horizontal grill.

8. A barbecue grill as recited in claim 7 wherein said bottom support member rests on the bottom of said housing and includes vertical walls extending both lengthwise and widthwise in said housing.

9. A barbecue grill as recited in claim 8 wherein said fireboxes, support rail, upper and lower horizontal grills, and bottom support members are constructed of expanded metal and are maintained in assembled relationship solely by upward and lateral restraint imposed by each other and said housing to permit them to be assembled and disassembled merely by being lowered in and lifted out of said housing.

10. A barbecue grill as recited in claim 9 wherein said upper and lower horizontal grills are identical and interchangeable.

11. A barbecue grill as recited in claim 10 further comprising a removable drip pan mounted on said lower horizontal grill in the space below said support rail.

12. A barbecue grill as recited in claim 10 comprising a pair of said grill assemblies positioned in close end-to-end relationship, and a removable wall mounted between said assemblies to form one end wall for each assembly, the fireboxes of the different assemblies being aligned in end-to-end relationship and the upper and lower horizontal grills of the different assemblies being respectively coplanar, whereby said grill assemblies may be used either separately with said removable wall in place or as a single unit with said removable wall removed.

13. A barbecue grill as recited in claim 11 wherein the upper and lower horizontal grills of each of said assemblies are identical and interchangeable.

14. A barbecue grill as recited in claim 1 wherein said spacer means includes a drip pan positioned beneath said upper horizontal grill between said fireboxes and maintaining the spacing of said fireboxes.

15. A barbecue grill as recited in claim 14 wherein said spacer means further includes brackets mounted on the outer edges of said upper horizontal grill releasably engaging said fireboxes to support said upper horizontal grill and to maintain the spacing between said fireboxes.

16. A barbecue grill as recited in claim 15 wherein said bottom support member comprises a plurality of legs resting on the bottom of said housing, side members extending lengthwise and widthwise in said housing, and support arms carried by said side members and supporting said drip pans.

17. A barbecue grill as recited in claim 16 wherein said fireboxes, upper horizontal grill, drip pans, and bottom support members are maintained in assembled relationship solely by upward and lateral restraint imposed by each other and said housing to permit them to be assembled and disassembled merely by being lowered in and lifted out of said housing.

18. A barbecue grill as recited in claim 17 comprising a pair of grill assemblies positioned in close end-to-end relationship, and a removable wall mounted between said assemblies to form one end wall for each assembly, the fireboxes of the different assemblies being aligned in end-to-end relationship and the upper horizontal grills and drip pans of the different assemblies being respectively coplanar, whereby said grill assemblies may be used either separately with said removable wall in place or as a single unit with said removable wall removed.

19. A barbecue grill for cooking food with charcoal, which comprises a ventilated housing having end walls, side walls and a bottom defining a chamber therein, and a cover having a curved inner surface, and a grill assembly positioned in said housing, said grill assembly comprising:

two spaced vertically disposed fireboxes in said housing parallel and contiguous to said side walls for receiving charcoal, an upper horizontal grill extending from one firebox to the other for receiving the food to be cooked, said upper horizontal grill having a plurality of downwardly extending brackets on the outer edges thereof lockingly engaging the inner edges of the tops of said fireboxes so that said fireboxes support said upper horizontal grill and said upper horizontal grill maintains the spacing of said fireboxes;

a drip pan positioned beneath said upper horizontal grill between said fireboxes and further maintaining the spacing of said fireboxes;

a bottom support frame positioned below said fireboxes and maintaining said fireboxes and said drip pan spaced above the bottom of said housing, said bottom support frame having a plurality of legs resting on the bottom of said housing and side members supported by said legs extending lengthwise and widthwise in said housing and supporting said fireboxes, said side members having a plurality of inwardly extending arms supporting said drip pan, said fireboxes, upper horizontal grill, drip pan, and bottom support member being maintained in assembled relationship solely by upward and lateral restraint imposed by each other and said housing to permit them to be assembled and disassembled merely by being lowered in and lifted out of said housing.

* * * * *